United States Patent
Yang

(10) Patent No.: US 6,817,436 B2
(45) Date of Patent: Nov. 16, 2004

(54) BRAKE PEDAL PUSH-PREVENTION STRUCTURE OF A VEHICLE

(75) Inventor: Seong-Ho Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 65 days.

(21) Appl. No.: 10/246,313

(22) Filed: Sep. 17, 2002

(65) Prior Publication Data
US 2003/0052481 A1 Mar. 20, 2003

(30) Foreign Application Priority Data
Sep. 20, 2001 (KR) .......................... 2001-58222

(51) Int. Cl.[7] .............................. B62D 1/19; F16F 7/12
(52) U.S. Cl. ...................... 180/275; 188/371; 280/777
(58) Field of Search ............................. 180/274, 275; 188/371, 377; 280/777, 748, 750

(56) References Cited

U.S. PATENT DOCUMENTS

| | | | |
|---|---|---|---|
| 4,325,268 A | | 4/1982 | Benteler et al. |
| 5,503,431 A | | 4/1996 | Yamamoto |
| 5,511,823 A | | 4/1996 | Yamaguchi et al. |
| 5,653,146 A | | 8/1997 | Barton |
| 6,099,036 A | | 8/2000 | Fujiu et al. |
| 6,176,340 B1 | * | 1/2001 | Mizuma et al. ............. 180/274 |
| 6,178,846 B1 | * | 1/2001 | Specht et al. ................. 74/512 |
| 6,182,526 B1 | * | 2/2001 | Brooks ........................ 74/512 |
| 6,336,376 B1 | * | 1/2002 | Lee .............................. 74/512 |
| 6,339,971 B1 | * | 1/2002 | Kato ............................ 74/512 |
| 6,375,220 B1 | * | 4/2002 | Kamm ....................... 280/777 |
| 2001/0006010 A1 | * | 7/2001 | Choi ........................... 74/512 |

FOREIGN PATENT DOCUMENTS

| | | | |
|---|---|---|---|
| DE | 93 07 274 U1 | 5/1993 | |
| DE | 195 22 398 | 6/1995 | |
| EP | 0 581 432 B1 | 6/1993 | |
| EP | 1074445 A2 * | 2/2001 | ............. B60T/7/06 |
| WO | WO95/09757 | 9/1994 | |

* cited by examiner

Primary Examiner—Paul N. Dickson
Assistant Examiner—Laura B. Rosenberg
(74) Attorney, Agent, or Firm—Morgan Lewis & Bockius LLP

(57) ABSTRACT

The invention relates to a brake pedal push-prevention structure of a vehicle. The structure has an active stopper formed between an upper steering shaft and a universal joint of a lower steering shaft. The active stopper is positioned in front of the brake pedal to prevent the brake pedal from being pushed toward the driver during a car crash, thereby potentially reducing injury to the driver's leg and improving the safety of the vehicle.

18 Claims, 5 Drawing Sheets

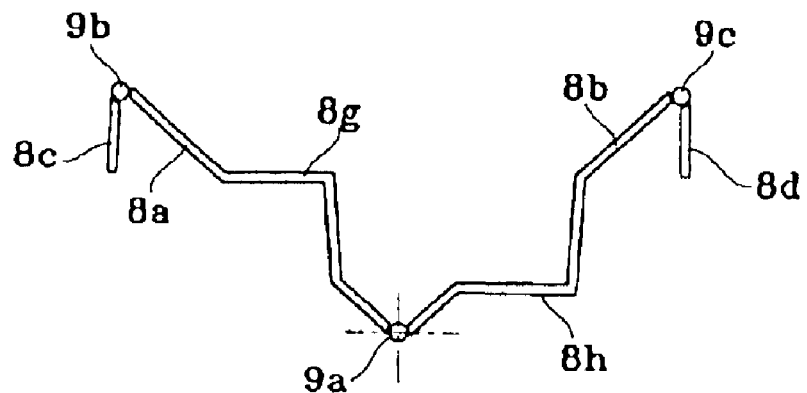
FIG.7 (a)
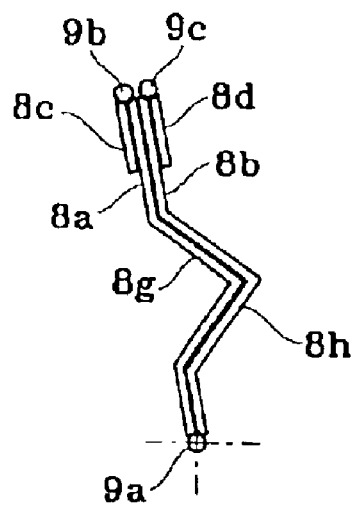
FIG.7 (b)
FIG.8
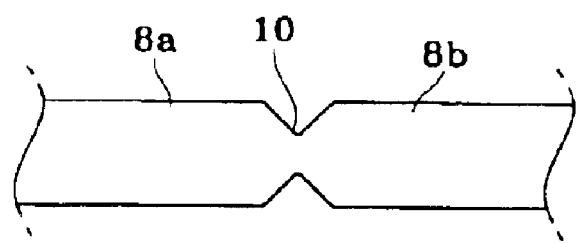

BRAKE PEDAL PUSH-PREVENTION STRUCTURE OF A VEHICLE

FIELD OF THE INVENTION

The present invention relates to a vehicle brake pedal, and more particularly, to a brake pedal push-prevention structure that blocks the brake pedal when actuated by collapse of the steering column in the event of a vehicle collision.

BACKGROUND OF THE INVENTION

Generally, when a vehicle collides with another vehicle or an object, the driver's body is rapidly swung forward and the upper torso and/or face smashes against the steering wheel due to the inertial force of the moving vehicle. Preferably, there is a safety means analogous to a seatbelt and airbag installed in the steering wheel or steering column to reduce or minimize injury to the driver. For this reason, a steering column is generally constructed with an upper steering shaft and a lower steering shaft inserted in the upper steering shaft. The lower steering shaft is connected with a gear box via a universal joint, and the upper steering shaft is mounted in a cowl cross member positioned inside a crash pad.

When a vehicle collision causes the driver's upper torso or face to impact the steering wheel, a pin or a similar structure that connects the upper and lower steering shafts is broken and the upper steering shaft is pushed downward (the lower steering shaft gets inserted into the upper steering shaft). Thus, the shock of the vehicle collision and impact on the driver are minimized.

If the force of the collision is great, causing the engine compartment to be broken inwards and deform the dash panel toward the driver. In addition, a brake pedal, mounted on the dash panel, is pushed inward in the direction of the driver. There can be a significant problem because most drivers continue to forceably step on the brake pedal during the collision. As a result, the driver may seriously injure his leg upon the impact of the brake pedal being pushed toward the driver.

Thus, a limited level of brake pedal movement is regulated as a safety item in a car test. However, in a typical prior art vehicle, the only structure that prevents the brake pedal from being pushed toward the driver is the dash panel on which the brake pedal is mounted. Otherwise, there is no other structure to prevent the brake pedal from being pushed toward the driver.

Therefore, in addition to enhancement of the strength of the dash panel, it is necessary to develop a structure to prevent the brake pedal from being pushed toward the driver at the time of the vehicle collision.

SUMMARY OF THE INVENTION

The present invention provides a brake pedal push-prevention structure that limits the force of the brake pedal being pushed toward the driver at the time of a vehicle collision, thereby reducing the possibility of injury to a driver's leg. According to an embodiment of the present invention, a lower steering shaft is fitted into an upper steering shaft that telescopes in the event of a vehicle collision. An active stopper is installed at a predetermined position between the upper and lower steering shafts to block the path of the brake pedal moving toward the driver in the event of a vehicle collision. Preferably, this is accomplished by the stopper folding and projecting to the front side of the brake pedal when the upper steering shaft slides down to be inserted into the lower steering shaft.

BRIEF DESCRIPTION OF THE DRAWINGS

Objects and aspects of the invention will become apparent from the following description of preferred embodiments with reference to the accompanying drawings in which:

FIGS. 7a and 7b illustrate a fourth embodiment of the active stopper in accordance with the present invention; and FIG. 8 illustrates a modified embodiment of the active stopper hinging unit in accordance with the present invention.

DETAILED DESCRIPTION OF THE INVENTION

Hereinafter, the preferred embodiments of the present invention will be described in detail with reference to the accompanying drawings.

Figure 1:
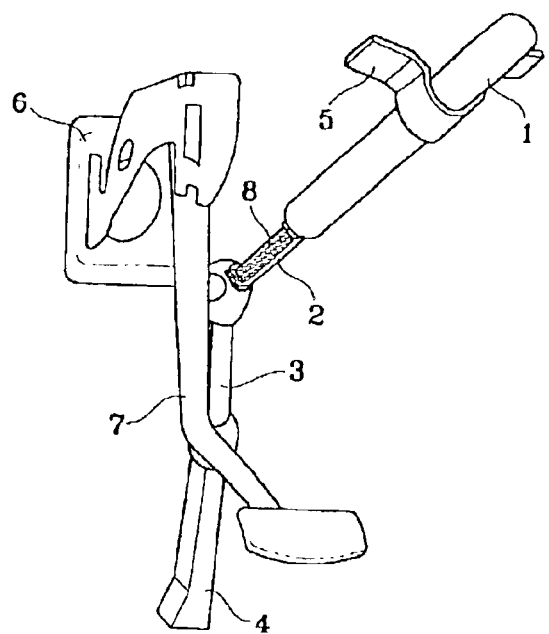
FIG. 1 is a perspective view illustrating an installation state of a steering column and brake pedal, where a structure preventing the brake pedal from being pushed is applied in accordance with the present invention.

As shown in FIG. 1, the lower steering shaft 2 is inserted and connected into the upper steering shaft 1. The two shafts are connected by means such as a sheerable pin so that the upper steering shaft 1 slides down due to the driver impact in the event of a car crash. The lower steering shaft 2 is connected with the gear box 4 via a universal joint 3, and the upper steering shaft 1 is mounted at a cowl cross member by the mounting bracket 5. The upper end of the brake pedal 7 is rotatably fixed at mounting bracket 6 mounted on a dash panel.

According to an aspect of the present invention, an active stopper 8 is installed between the upper steering shaft 1 and a joint portion between the universal joint 3 and the lower steering shaft 2. Stopper 8 blocks the route of the brake pedal when pushed toward the driver at the time of a car crash. To do this, the active stopper 8 projects in the front of the brake pedal 7.

Figure 2:
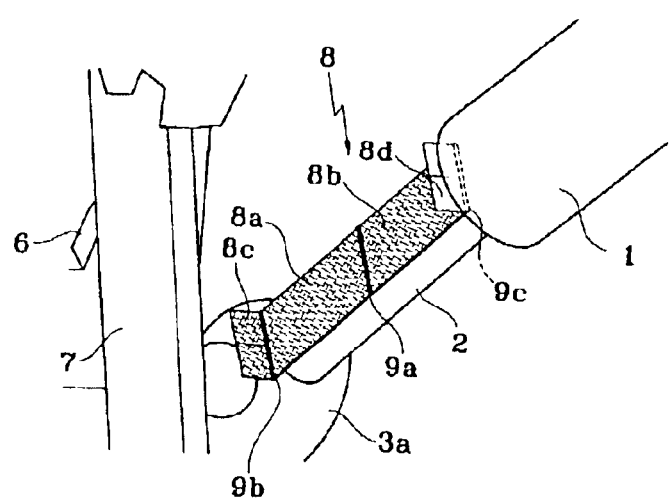
FIG. 2 is a partially enlarged view for illustrating the important parts shown in FIG. 1.

As shown in FIG. 2, the active stopper 8 includes: stopper member units 8a, 8b, longer than the route of the brake pedal 7 being pushed toward the driver from the lower steering shaft 2; a hinge 9a that longitudinally connects the two stopper member units 8a, 8b; and support members 8c, 8d respectively connected at free ends of the stopper member units. The support members 8c, 8d are fixed at the lower end of the upper steering shaft 1 and the upper joint part 3a of the universal joint 3 formed at the lower steering shaft 2. When the active stopper 8 is in a normal, non-deployed position, the stopper member units 8a, 8a are completely unfolded and the support members 8c, 8d are almost perpendicularly folded at both ends.

At the time of the car crash, the upper steering shaft 1 is pushed downward by the force of the driver's upper body smashing against the steering wheel, so that the active stopper 8, positioned between the upper steering shaft 1 and the universal joint 3, bends outward in a folding manner.

Figure 3:
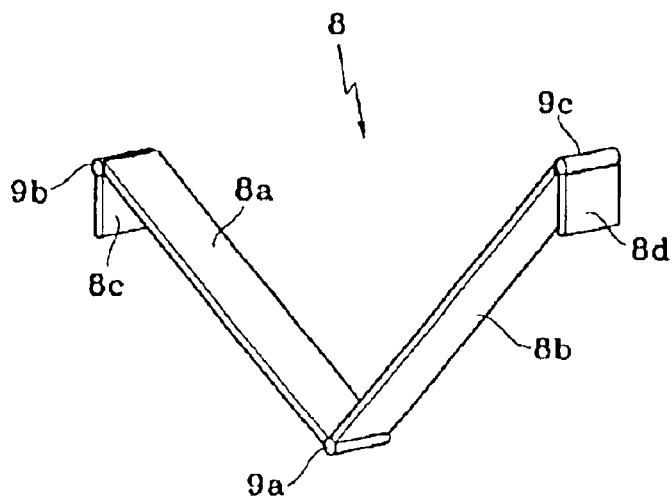
FIGS. 3a and 3b illustrate an active stopper transformed by a crash impact according to the invention.
Figure 3:
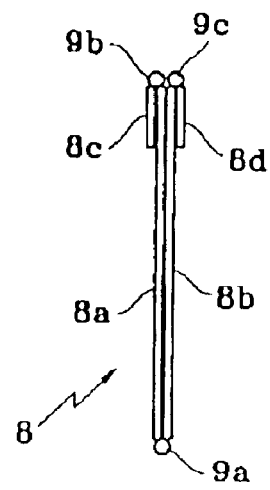

In other words, as shown in FIGS. 3a and 3b, the distance between both of the support members 8c, 8d decreases as the lower end of the upper steering shaft 1 and the upper joint part 3a of the universal joint 3 get closer. The three hinges 9a, 9b, 9c all fold, causing the stopper member unit 8a, 8b to fold while the middle hinge 9a projects toward the brake pedal 7.

Figure 4:
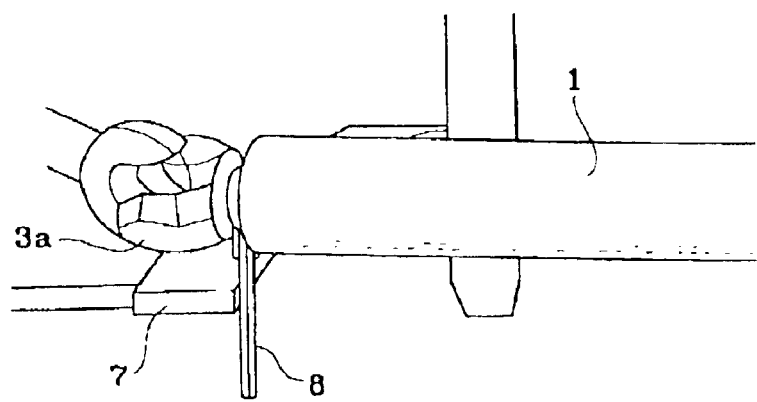
FIG. 4 illustrates an active stopper transformed for preventing a brake pedal from being pushed toward the driver.

As shown in FIG. 4, the upper steering shaft 1 completely slides down and the two folded stopper member units 8a, 8b are positioned closely in the front of the brake pedal 7. Therefore, although the brake pedal 7 is pushed toward the driver due to transformation of the dash panal at the time of the car crash, it will be blocked by the stopper member units 8a, 8b of the active stopper 8, thereby preventing it from further moving toward the driver and reducing the possibility of injury of the driver's leg.

Figure 5:
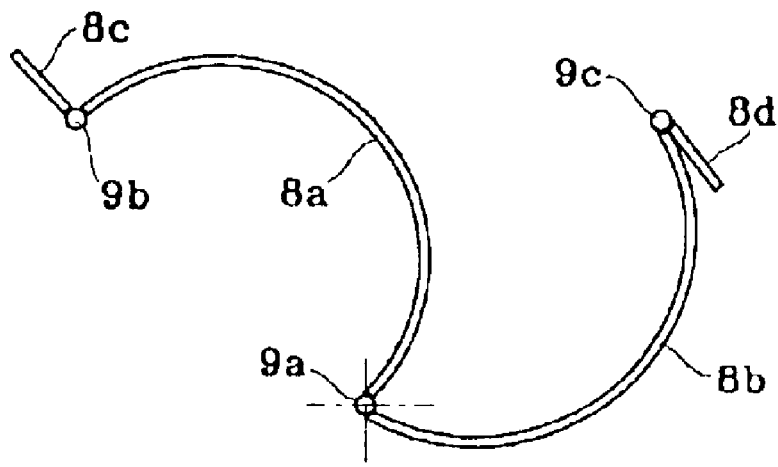
FIGS. 5a and 5b illustrate a second embodiment of the active stopper in accordance with the present invention.
Figure 5:
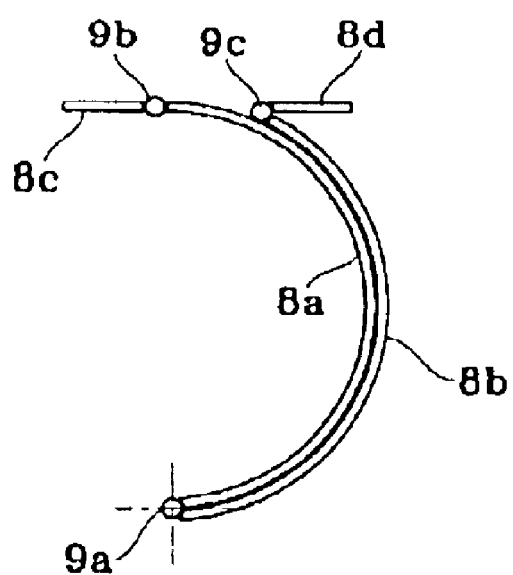

A variety of modifications can be made to the shape of the active stopper 8. For example, as shown in FIGS. 5a and 5b, the two stopper member units 8a, 8b, rather than being flat-shaped, are formed in a semi-circle shape, whereby the concave surfaces of the two stopper member units 8a, 8b fold to hitch the brake pedal at the time of the car crash.

Figure 6:
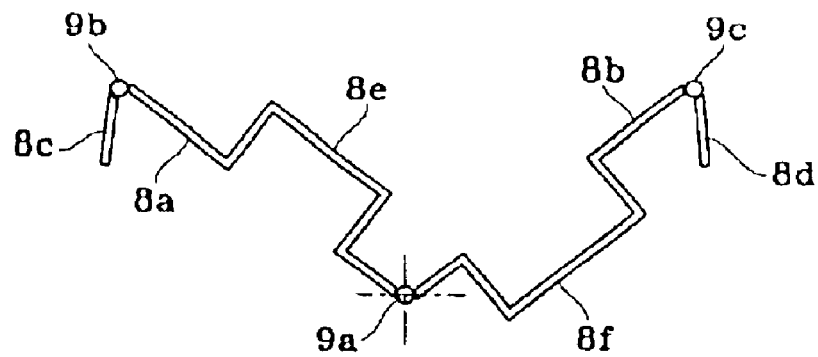
FIGS. 6a and 6b illustrate a third embodiment of the active stopper in accordance with the present invention.
Figure 6:
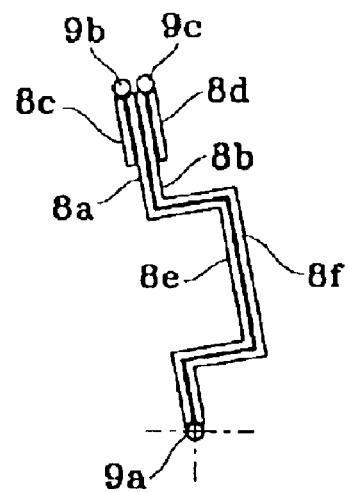

Also, as shown in FIGS. 6a and 6b, the two stopper member units 8a, 8b can be formed with support parts 8e, 8f which are rectangular in shape, the inner surfaces of which fold in the direction of the brake pedal preventing it from being pushed at the time of the car crash.

Furthermore, as shown in FIGS. 7a and 7b, the two stopper member units 8a, 8b can be formed with support parts 8g, 8h which are triangular in shape, the inner surfaces of which fold in the direction of the brake pedal preventing it from being pushed toward the driver at the time of the car crash.

In the three embodiments mentioned above, the installation method is the same as that of the active stopper formed with the simple flat stopper units. The support members 8c, 8d are fixed to the lower end of the upper steering shaft 1 and the upper joint part 3a of the universal joint 3. However, the active stopper having simple flat stopper member units 8a, 8b can be tightly placed onto the lower steering shaft 2 in an installation state. In case of the other various shapes of the stopper member units 8a, 8b, the stopper member units 8a, 8b cannot be closely positioned, but are rather placed apart at predetermined distances according to their shapes.

As a result, if a moving car crashes with its active stopper installed as described above, its stopper member units 8a, 8b become folded as shown in FIGS. 5b, 6b or 7b. At the same time, the brake pedal 7, pushed toward the driver by the crash, is received into the inner surface parts of the three other modified stopper member units. Therefore, it is possible for the active stopper in its more stable state to effectively resist the push of the brake pedal toward the driver.

The various shapes of the active stoppers are formed with individual parts like stopper member units 8a, 8b and support members 8c, 8d, which are then connected with hinges 9a, 9b, 9c. Alternatively, the active stopper can also be made as a whole unit without separate parts, whereby a notch 10 is formed at a position where the hinge 9a, 9b, 9c is mounted, or where the stopper member units are folded at the time of a car crash, as shown in FIG. 8. The notch 10 acts in the same manner and produces the same effect as the other active stoppers formed with individual parts.

In other words, the active stopper 8 can be constructed with a single unit of a stopper member, twice as long as the distance of the brake pedal 7 being pushed from the lower steering shaft 2. A notch is formed to be folded in the middle of the stopper member and support members are respectively connected at both ends of the stopper member. The support members can be connected with the stopper members selectively by a hinge or a notch.

As described above, there are advantages in the present invention in that an active stopper is included in the steering column, which folds to hitch the front of the brake pedal, as the upper steering shaft slides downward, preventing the brake pedal from being excessively pushed toward a driver at the time of a car crash, thereby reducing potential injury to the driver's leg and improving the safety of the vehicle.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A brake pedal push-prevention structure of a vehicle, the structure comprising:
   an upper steering shaft;
   a lower steering shaft into which the upper steering shaft slides and becomes inserted in the event of a car crash; and
   an active stopper installed between predetermined positions of the upper and lower steering shafts to block the brake pedal when pushed toward the driver in the event of a car crash, said stopper being folded and projected toward the front of the brake pedal when the upper steering shaft slides down to be inserted into the lower steering shaft.

2. The structure, as defined in claim 1, wherein the active stopper includes: a stopper member, having a length sufficient to block the brake pedal when pushed toward the driver from the lower steering shaft; a notch formed at a middle portion of the stopper member to permit folding; and support members respectively connected at free ends of said stopper member.

3. The structure, as defined in claim 2, wherein said stopper member is formed in a flat shape.

4. The structure, as defined in claim 2, wherein said stopper member is formed in a semi-circle shape, the inner surface of which folds to hitch the pushed brake pedal.

5. The structure, as defined in claim 2, wherein said stopper member is formed in a rectangular shape, the inner surface of which folds to hitch the pushed brake pedal.

6. The structure, as defined in claim 2, wherein the stopper member is formed in a triangular shape, the inner surface of which folds to hitch the pushed brake pedal.

7. The structure, as defined in claim 2, wherein the support members are integrated to said stopper members and divided by a notch formed at their connection.

8. The structure, as defined in claim 2, wherein said support members are connected with said stopper member by a hinge.

9. The structure, as defined in claim 1, wherein said active stopper includes: two stopper member units, of sufficient length to block the brake pedal when pushed toward the driver from said lower steering shaft; a hinge that longitudinally connects the two stopper member units; and support members respectively connected at free ends of said stopper member units.

10. The structure, as defined in claim 9, wherein said stopper member units are formed in a semi-circle shape, wherein the inner surfaces of said stopper member units fold to hitch the pushed brake pedal.

11. The structure, as defined in claim 9, wherein the support parts are formed in a rectangular shape, wherein the inner surfaces of said stopper member units fold to hitch the pushed brake pedal.

12. The structure, as defined in claim 9, wherein said support parts are formed in a triangular shape, wherein the inner surfaces of said stopper member units fold to hitch the pushed brake pedal.

13. The structure, as defined in claim 9, wherein the support member units are integrated to said stopper member units and divided by a notch formed at their connection.

14. The structure, as defined in claim 9, wherein said support members are connected with said stopper member units by a hinge.

15. A brake pedal push prevention structure adapted to be mounted on a steering column, wherein the steering column includes first and second members that collapse together in response to an impact thereon and wherein the brake pedal is mounted adjacent the steering column with a space therebetween, said structure comprising a stopper mounted to the steering column, said stopper being extendable to a position blocking movement of the brake pedal in response to collapse of the steering column, wherein said stopper comprises a foldable structure configured and dimensioned to be secured at one end to the first steering column member and secured at an opposite end to the second steering column member.

16. The structure as defined in claim 15, wherein said foldable structure is at least twice as large as the space between the steering column and brake pedal.

17. The structure as defined in claim 16, wherein said foldable structure comprises at least two members with a hinge in between.

18. The structure as defined in claim 16, wherein said foldable structure comprises a member notched at a mid point.

* * * * *